July 11, 1950     C. J. CALLAHAN     2,514,838
NONSTICKING BACK PRESSURE VALVE
Filed Nov. 18, 1946
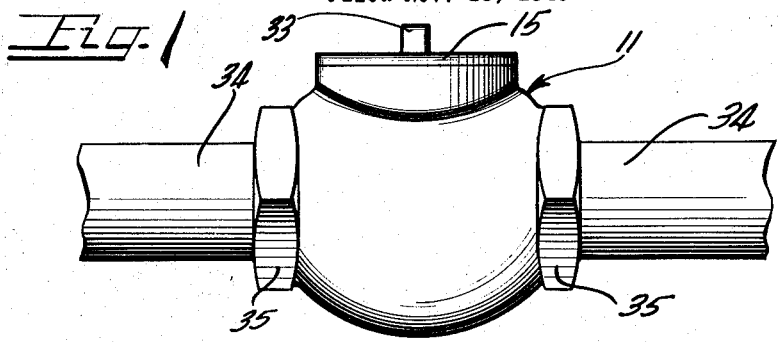
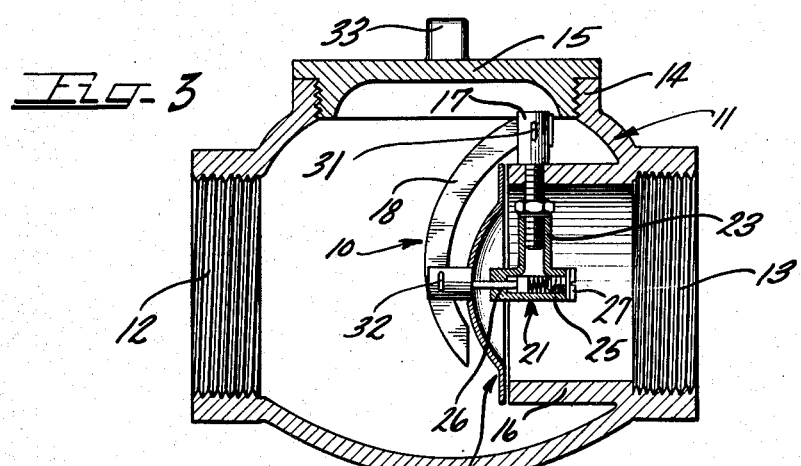
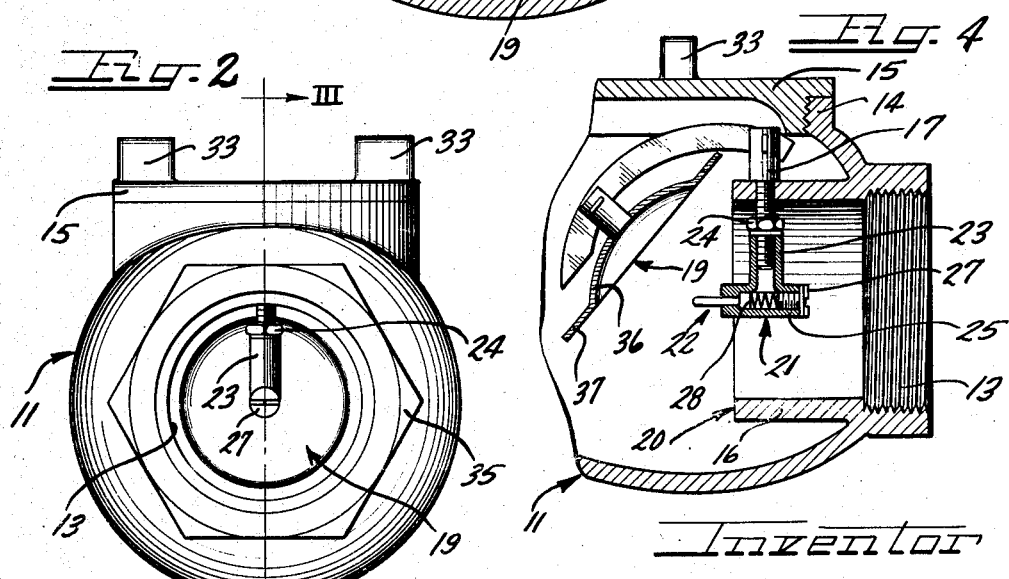
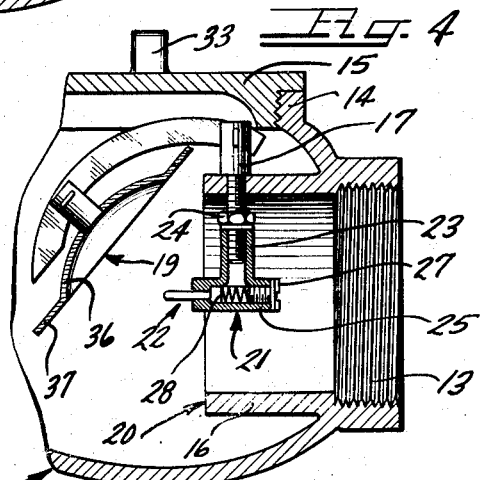
Inventor
CHARLES J. CALLAHAN
by *[signature]*
Attys.

Patented July 11, 1950

2,514,838

UNITED STATES PATENT OFFICE 2,514,838

NONSTICKING BACK-PRESSURE VALVE

Charles J. Callahan, Chicago, Ill.

Application November 18, 1946, Serial No. 710,534

2 Claims. (Cl. 251—123)

This invention relates to improvements in a back pressure valve substantially insured against sticking, the invention being highly desirable in industrial applications where high pressure air is employed in conjunction with gas burners.

Back pressure valves are commonly used to prevent reverse flow of high pressure air into gas mains when burner orifices become clogged or when the burner is closed without shutting off the high pressure air. This reverse flow extinguishes pilot lights and creates danger of asphyxiation and explosion.

Heretofore back pressure valves frequently stuck when oil or tars in the gas were deposited on the seating surfaces of the valve, requiring a service call and consequent delay and expense.

It is therefore an important object of the invention to provide a back pressure valve which is substantially free from the inconvenience of sticking.

Another object of the invention is the provision of means for substantially insuring a back pressure valve against sticking which does not interfere with the normal operation of the valve in case of back pressure.

Still another object of the invention is to provide means for preventing a back pressure valve from sticking which is adjustable to function effectively under varying conditions of pressure, temperature, or other factors affecting sticking.

It is also an object of this invention to provide a non-sticking device for back pressure valves, which is attachable to many back pressure valves now in use.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings, in which:

Figure 1 is a fragmentary side elevational view of a back pressure valve attached to a fluid conduit and embodying the novel teachings of the present invention;

Figure 2 is an end elevational view of a back pressure valve of the type shown in Figure 1;

Figure 3 is a longitudinal cross-sectional view, taken along the line III—III of Figure 2, illustrating the valve in normal closed position; and Figure 4 is a fragmentary view similar to Figure 3 but showing the valve in opened position.

As shown on the drawings:

The valve 10 is contained within a hollow, open-ended body or housing 11, mounted in conduit 34 and having an internally threaded outlet end 12 and an internally threaded inlet end 13. An extension conduit 16 projects into the housing 11 from the inlet end 13, providing a flat annular valve seat 20. A plug 15 threaded into the upper portion 14 of the housing 11 furnishes access to the valve 10. Inlet end 13 and outlet end 12 are provided with wrench-engaging external portions 35 to facilitate attaching the housing 11 to the conduit 34. Plug 15 has raised lugs 33 of rectangular cross section, permitting removal of the plug for access to the valve.

The valve 10 is mounted within the housing by means of a bolt 17 threaded into and depending within the extension conduit 16. Without the conduit 16, an arm 18 has one end pivotally attached at 31 to the head of bolt 17 and the other end pivotally attached at 32 to a valve closure 19. Within the conduit 16 is a T-shaped hollow tubular member 21 threaded onto the depending bolt 17.

The valve closure 19, preferably made of aluminum or other suitable lightweight non-corroding metallic alloy, comprises a cup-shaped center portion 36 and a flat, annular outer flange 37 seating against the annular valve seat 20. This type of valve arrangement is well known in the art and need not be further described.

The hollow tubular T-shaped member 21, which is the non-sticking mechanism of the present invention, includes a vertical internally threaded hollow tubular leg 23 terminated at one end by a wrench-engaging portion 24 for attaching leg 23 to the depending bolt 17. At the other end, a hollow tubular leg 25 extends horizontally in both directions from leg 23, this leg 25 being internally threaded at one extremity and having a narrowed tubular passageway 26 at the other. An adjusting set screw 27 threads into one end of the leg 25 and abuts a spring 28 selectively adjusting the compression thereof. The enlarged head portion of a plunger 22 slides within the hollow tubular leg 25 and co-operates with the spring 28. The stem of the plunger slides in the narrowed tubular passage 26 and is engageable with the valve closure 19, exerting a light resilient pressure, just sufficient to permit the valve closure to nearly seat but to prevent it from sticking to the seat 20.

In order to illustrate the operation of the valve of the present invention, its use with a gas burner will be assumed as an example.

When the gas is turned on, the normal pressure differential of the gas in conduit 34 forces the valve closure 19 into open position and the gas passes through the housing 11 and out the conduit 34 to the burner. When the gas is shut off, the pressure rapidly equalizes on either side of the valve and the valve then closes, under force of gravity, against the resilient opposition of the spring-pressed plunger 22, so that the valve is not quite seated and will readily reopen when the gas is turned on and conditions of normal pressure differential within the conduit 34 are restored.

The force of gravity tending to close the valve is quite small at the normal, nearly closed position of the valve, so that only a very light spring pressure is required to prevent sticking. It will be noted that this slight spring pressure will not interfere with the sealing of the valve should a back pressure such as from high pressure air occur. The degree of compression of the spring may be adjusted to compensate for different conditions of pressure differential by simply adjusting the compression of the spring by means of adjusting set screw 27.

The spring pressure also minimizes the possibility of the valve remaining stuck after the valve has been tightly sealed due to temporary back pressure. In general, the compression of the spring may be adjusted to the maximum amount which will not interfere with the positive sealing of the valve in case of back pressure.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A back pressure check valve for use with a fuel gas supply pipe comprising a housing having gas inlet and outlet ports, a conduit registering with the inlet port and extending inwardly of the housing, the inner end of the conduit having a plane annular surface constituting a valve seat, a thin disc valve having a peripheral margin seatable on said valve seat, an arm pivotally attached to the central portion of said valve, a post extending through said conduit, said arm being pivotally supported on said post outside of said conduit, a tubular member secured to said post within said conduit, a light spring in said tubular member, an abutment for one end of said spring, and a plunger abutting the other end of said spring extending from said tube and positioned for contacting said valve centrally only when seated and nearly seated, the plunger and spring being effective in the absence of gas flow to lightly hold the valve slightly off said seat but yieldable to enable the valve to seat responsive to a small back pressure from the outlet port exceeding the gas inlet pressure.

2. A back pressure check valve for use with a fuel gas supply pipe comprising a housing having gas inlet and outlet ports, a conduit registering with the inlet port and extending inwardly of the housing, the inner end of the conduit having a plane annular surface constituting a valve seat, a thin disc valve having a peripheral margin seatable on said valve seat, an arm pivotally attached to the central portion of said valve, a post extending through said conduit, said arm being pivotally supported on said post outside of said conduit, a tubular member secured to said post within said conduit, means for vertically adjusting said tube on said post, a light spring in said tube, and a plunger abutting said spring extending from one end of said tube and positioned for contacting said valve centrally only when seated and nearly seated, a spring compression adjusting screw closing the other end of said tube, the plunger and spring being effective in the absence of gas flow to lightly hold the valve slightly off said seat but yieldable to enable the valve to seat responsive to a pressure from the outlet port exceeding the gas inlet pressure.

CHARLES J. CALLAHAN.

REFERENCES CITED

The following references are of record in the file of this patent:

UNITED STATES PATENTS

| Number | Name | Date |
|---|---|---|
| 345,420 | Eskholme | July 13, 1886 |
| 371,063 | Hays | Oct. 4, 1887 |
| 420,367 | Walker | Jan. 28, 1890 |
| 580,294 | Stone | Apr. 6, 1897 |
| 769,201 | Blarcon | Sept. 6, 1904 |
| 1,050,646 | Grove | Jan. 14, 1913 |
| 1,052,633 | Whiteman | Feb. 11, 1913 |
| 1,447,102 | Rae | Feb. 27, 1923 |
| 1,480,942 | McKee | Jan. 15, 1924 |
| 1,699,085 | Vera | Jan. 15, 1929 |
| 1,725,637 | Helmick | Aug. 20, 1929 |
| 1,777,580 | Russell | Oct. 7, 1930 |
| 1,781,366 | Campula | Nov. 11, 1930 |
| 2,048,943 | Munn | July 28, 1936 |